Patented June 19, 1928.

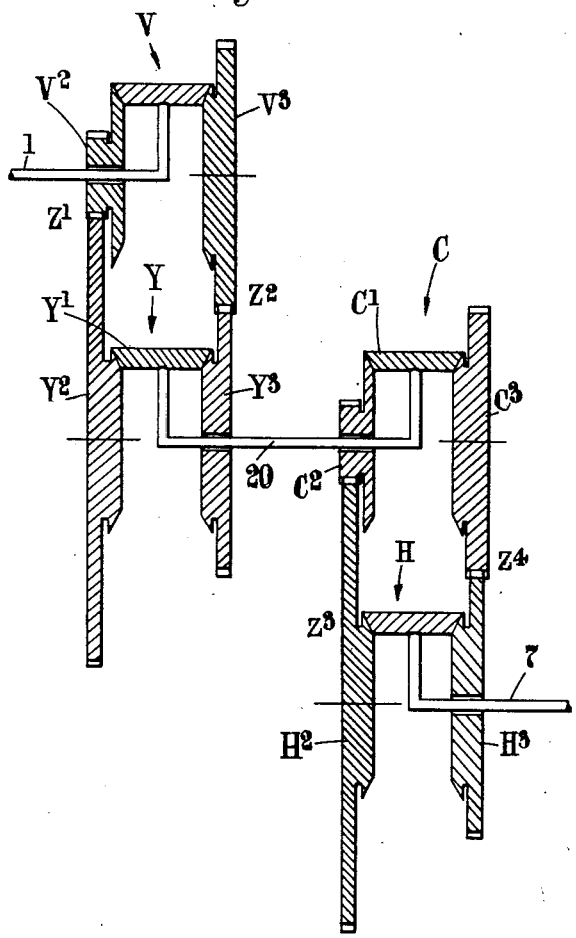

1,674,143

UNITED STATES PATENT OFFICE.

WILLIAM STROUD AND JAMES WEIR FRENCH, OF GLASGOW, SCOTLAND, ASSIGNORS TO BARR AND STROUD, LIMITED, OF ANNIESLAND, GLASGOW, SCOTLAND.

APPARATUS FOR IMPARTING MOVEMENTS.

Application filed December 14, 1923, Serial No. 680,779, and in Great Britain December 20, 1922.

This invention refers to apparatus for imparting movements to a following element in accordance with movements applied to a transmitter element. Apparatus to which this invention refers may be for use generally, but is particularly applicable for use in transmitting large numbers of separate indications or steps under conditions in which transmission at high speeds may be required or in which the inertia of parts to be moved is great. For gunnery purposes transmission of bearing angles in steps, of, say, two minutes of angle, at speeds reaching several hundreds per second is sometimes required.

In apparatus according to this invention provision is made for reducing the speed imparted to the following element when the fiducial position, the position corresponding with that of the transmitter element, is nearly reached, so as to cause the following element to be brought to rest gradually whereby oscillatory or hunting movements about the fiducial position are eliminated or reduced.

Apparatus according to this invention comprises a transmitter device, having a transmitter element, a first mechanism and a second mechanism, the second mechanism having a following element, the first mechanism comprising differential gearing and being for producing with speed variation rotation in one and one direction only corresponding to a drive applied to be imparted to the following element, and the second mechanism comprising differential gearing and being for determining direction of rotation of the following element, the apparatus having means for controlling the actions of the first and second mechanisms in accordance with movements of the transmitter element, and the second mechanism is located between the following element and the first mechanism.

In one example of construction the first mechanism may comprise, a first shaft, a power drive applied to the first shaft to rotate it in one and one direction only, a second shaft, a first and a second differential, one element, a first element, of the first differential connected to rotate with the first shaft, and one element, a first element, of the second differential connected to rotate with the second shaft, means, actuated by control from the transmitter device, for restraining or preventing rotation of the second and the third elements of the first differential, two motion transmitter connections, a first connection for transmitting motion from the second element of the first differential to the second element of the second differential and a second connection for transmitting motion from the third element of the first differential to the third element of the second differential, the first and second connections being of differing ratios and such as to impart drives each in one and the same direction only to the second shaft, and the second mechanism may comprise a third shaft, a third and a fourth differential, one element a first element of the third differential connected to rotate with the second shaft, one element a first element of the fourth differential connected to rotate with the third shaft, means, actuated by control from the transmitter device, for restraining or preventing rotation of the second and third elements of the fourth differential, two motion transmitter connections, a third connection for transmitting motion from the second element of the third differential to the second element of the fourth differential, a fourth connection for transmitting motion from the third element of the third differential to the third element of the fourth differential, the third and fourth connections being such as to impart drives each in one but reverse directions to the third shaft, in this case the following element.

The first mechanism may comprise more than two differentials and more than two principal variations of speed may be produced.

An example of construction and modification according to this invention will now be described with reference to the accompanying drawings, in which:—

Figure 3 is a sectional diagram illustrating a modification of the first mechanism.

Figure 1:
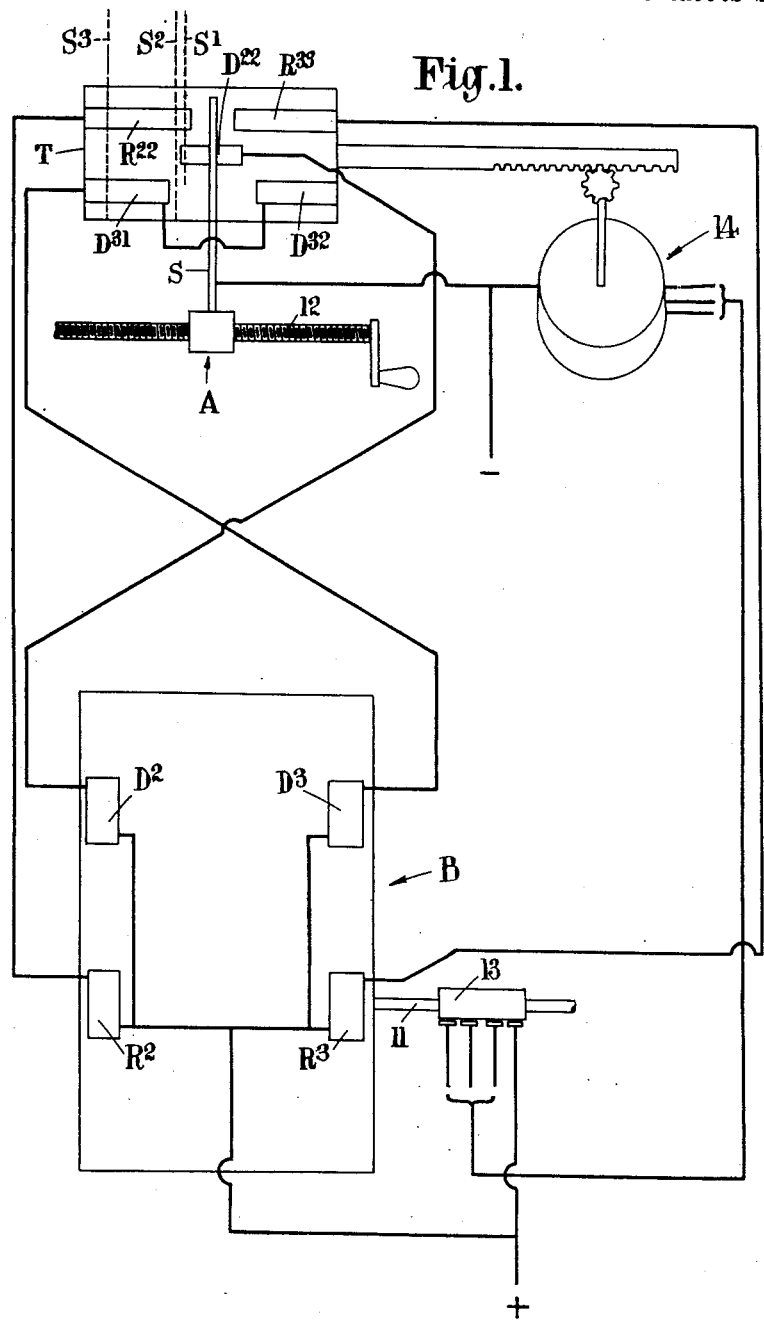
Figure 1 is a diagram illustrating an apparatus.
Figure 2:
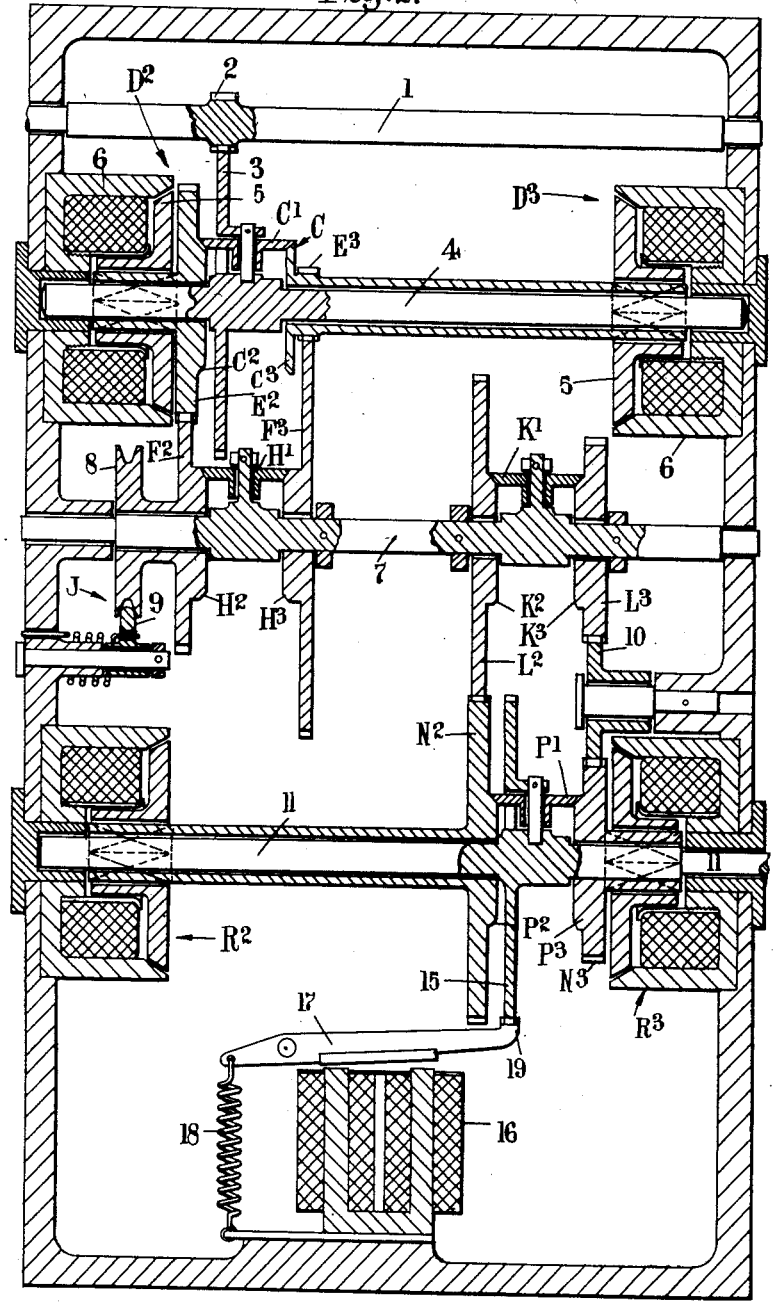
Figure 2 is a sectional illustration of a first mechanism associated with a second mechanism of the apparatus.

In the drawings A designates a transmitter device and B the first and second mechanisms of the apparatus to be described particularly with reference to Figures 1 and 2.

The first mechanism, see particularly Figure 2, comprises a driving shaft 1, driven, say, by an electric motor, a toothed pinion 2, connected to rotate with shaft 1, which gears with a toothed wheel 3 connected to rotate with a shaft 4. $C^1$, $C^2$, $C^3$ are the elements of a first differential C. The jockey element $C^1$ is mounted to rotate with the shaft 4 being carried on a spindle extending radially from shaft 4, the second and third elements $C^2$, $C^3$ are mounted to rotate about the axis of the shaft 4. Associated with the elements $C^2$ is a clutch device $D^2$ and with the element $C^3$ a clutch device $D^3$. Each clutch device illustrated comprises a friction disc 5 mounted to rotate with its element $C^2$ or $C^3$ but free to move endwise, and an electro-magnet 6. In action when an electro-magnet 6 is energized a clutching effect is produced and its associated element $C^2$ or $C^3$ is restrained or prevented from rotating and when de-energized its element $C^2$ or $C^3$ is free to rotate. Connected to rotate with the element $C^2$ is a toothed gear $E^2$ and with the element $C^3$ a toothed gear $E^3$, which gear respectively with toothed gears $F^2$ and $F^3$. $H^1$, $H^2$, $H^3$ are the elements of a second differential. The jockey element $H^1$ is mounted to rotate with a shaft 7, being carried by a spindle extending radially from shaft 7, the second and third elements $H^2$, $H^3$ are mounted to rotate about the axis of the shaft 7. The ratio of the gears $E^2$, $F^2$ and $E^3$, $F^3$ are different, say, as 1:6. Associated with the element $H^2$ is a device J for permitting rotation of that element in one and one direction only. This device as indicated comprises a friction or ratchet wheel 8 connected to rotate with the element $H^2$ and a pawl 9.

The second mechanism, see particularly Figure 2, will now be described. The extent of rotation imparted by the shaft 7 which may require to be transmitted is subject to reversal in direction of rotation. In this case $K^1$, $K^2$, $K^3$ are the elements of a third differential. The jockey element $K^1$ is mounted to rotate with shaft 7 being carried on a spindle extending radially from shaft 7, the second and third elements $K^2$, $K^3$ are mounted to rotate about the axis of the shaft 7. Connected to rotate with the element $K^2$ is a toothed gear $L^2$ and with the element $K^3$ a toothed gear $L^3$ which drive respectively toothed gears $N^2$ and $N^3$, $L^2$ and $N^2$ gearing direct, and $L^3$ and $N^3$ driving through an intermediate gear 10. The gears $N^2$ and $N^3$ are mounted to rotate about the axis of a shaft 11. $P^1$, $P^2$, $P^3$ are the elements of a fourth differential. The jockey element $P^1$ is mounted to rotate with shaft 11 being carried on a spindle extending radially from shaft 11. Element $P^2$ is connected to rotate with gear wheel $N^2$ and element $P^3$ to rotate with gear wheel $N^3$. Associated with the element $P^2$ is a clutch device $R^2$ and with the element $P^3$ a clutch device $R^3$, similar to the clutches $D^2$, $D^3$. Shaft 11 is the following element of the apparatus.

The transmitter device illustrated, see Figure 1, comprises a transmitter element in this case a screw shaft 12 rotatable, say, by hand, a contactor S mounted on the screw shaft 12 by which it may be moved right or left, a plate T endwise movable in conformity with extent of movement and direction of rotation of shaft 11, by means, say, of step-by-step motor mechanism, comprising a commutator device 13 actuated by shaft 11 and a step-by-step motor device 14 for actuating the plate T. The plate T is of insulating material and is provided with electrical conductors $R^{22}$, $R^{33}$ associated respectively with clutch devices $R^2$, $R^3$, a conductor $D^{22}$ associated with clutch device $D^2$, and conductors $D^{31}$ and $D^{32}$ associated with clutch device $D^3$.

In operation of the apparatus, see Figures 1 and 2, action may occur as follows:—

Continuous motion in one and one direction only is imparted to shaft 1.

With contactor S in its neutral position, as shown at Figure 1, clutches $R^2$ and $R^3$ are free, shaft 11 is at rest. Clutch $D^2$ locks $C^2$.

Contactor S moved to the left, position $S^1$, clutch $R^2$ locks $N^2$, a drive, say, clockwise is imparted to shaft 11, clutch $D^2$ locks $C^2$, the drive passes through differential C by element $C^3$, slowest speed. Commutator 13 and motor 14 operate to move plate T to bring it to its neutral position.

Contactor S moved to position $S^2$, clutch $R^2$ still locks $N^2$, clockwise drive imparted to shaft 11, clutches $D^2$, $D^3$ free, drive passes through differential C by element $C^2$ or $C^3$ or both, distribution of the drive depending on the ratio of the resistances to the motions of $C^2$ and $C^3$. Plate T tends to move to neutral position.

Contactor S moved to position $S^3$, clutch $R^2$ still locks $N^2$ clockwise drive imparted to shaft 11, clutch $D^3$ locks $C^3$, drive passes through differential C by element $C^2$, highest speed. Plate T tends to move to neutral position.

If contactor S is displaced towards the right similar actions occur but with the direction of rotation of shaft 11 and endwise movement of the plate T reversed.

If an intermediate speed is not desired, see Figure 2, as is generally the case when the external load is greater than the internal resistance to motion, thus causing the intermediate speed to be approximately equal to the low speed, the clutch device $D^2$ may be dispensed with. The high speed is then brought into action by clutch device $D^3$ and in this case the low speed is obtained when $D^3$ is free.

Means for locking shaft 11 when the neutral position is reached may be provided. For example, see Figure 2, comprising a notched wheel 15 connected to rotate with shaft 11, an electro-magnet 16, a pivoted armature 17 acted on by a spring 18 and having a detent 19 to engage with wheel 15, the arrangement of the windings of electro-magnet 16 and clutch devices $R^2$, $R^3$ being such that when one or both of the clutch devices $R^2$, $R^3$ are energized the detent 19 is held from engaging wheel 15 by the action of the electro-magnet 16, but when neither $R^2$ nor $R^3$ is energized the electro-magnet 16 is not energized, the armature 17 is thereby released and detent 19 engages wheel 15.

In a modification, see Figure 3, the number of speeds may be increased by the addition, in this example, of two other differentials V and Y. In this case, as in Figure 2, shaft 1 is power driven and shaft 7 is the last shaft of the first mechanism. The drive applied passes through the differential V having side elements $V^2$, $V^3$ which gear respectively with side elements $Y^2$ $Y^3$ of the differential Y. Jockey element $Y^1$ rotates with a shaft 20 which drives jockey element $C^1$. The differentials C and H correspond with those described with reference to Figure 2. As before there should be no reversal of the direction of rotation of the side elements of the speed variation differentials. The differential H as in Figure 2 is provided with a device such as J, the differential Y or V is similarly provided. With this system there may then be obtained nine speeds whose values depend upon the ratios of the gear wheels employed and, so far as intermediate speeds are concerned, upon the external and internal resistances to the motions. Different speeds may be obtained as previously described by clutching the various sides $Z^1$, $Z^2$, $Z^3$, $Z^4$ of the pairs of differentials. The speeds, see Figure 3, are as follows:—

(1) All clutches free.
(2) Side $Z^1$, $V^2$ or $Y^2$ clutched.
(3) Side $Z^2$, $V^3$ or $Y^3$ clutched.
(4) Side $Z^3$, $C^2$ or $H^2$, clutched.
(5) Side $Z^4$, $C^3$ or $H^3$, clutched.
(6) Sides $Z^1$ and $Z^3$ clutched.
(7) Sides $Z^1$ and $Z^4$ clutched.
(8) Sides $Z^2$ and $Z^3$ clutched.
(9) Sides $Z^2$ and $Z^4$ clutched.

By increasing the number of speed differentials the number of speeds can be further increased.

Although typical differentials have been indicated, equivalent devices suitable for the purpose may be used.

We claim:—

1. Apparatus comprising a transmitter device, a first mechanism, and a second mechanism, the transmitter device having a transmitter element and the second mechanism having a following element, the first mechanism comprising differential gearing and being for producing with speed variation rotation in one and one direction only corresponding to a drive applied to be imparted to the following element, and the second mechanism comprising differential gearing and being for determining direction of rotation of the following element, the apparatus having means for controlling the actions of the first and second mechanisms in accordance with movements of the transmitter element, for the purposes set forth.

2. Apparatus comprising a transmitter device, a first mechanism, and a second mechanism, the transmitter device having a transmitter element, and the second mechanism having a following element, the first mechanism comprising differential gearing and being for producing with speed variation rotation in one and one direction only corresponding to a drive applied to be imparted to the following element, and the second mechanism comprising differential gearing and being for determining direction of rotation of the following element, the apparatus having means for controlling the actions of the first and second mechanisms in accordance with movements of the transmitter element, the second mechanism being located between the following element and the first mechanism, for the purposes set forth.

3. Apparatus comprising a transmitter device, a first mechanism and a second mechanism, the transmitter device having a transmitter element, and the second mechanism having a following element, the first mechanism being for producing with speed variation rotation in one and one direction only corresponding to a drive applied to be imparted to the following element, and the second mechanism being for determining direction of rotation of the following element, the apparatus having means for controlling the actions of the first and second mechanisms in accordance with movements of the transmitter element, the first mechanism comprising:—a first and second differential, a power drive applied to one element, a first element, of the first differential to rotate it in one and one direction only, one element, a first element, of the second differential capable of rotating in one and one direction only, means for restraining or preventing rotation of the second and the third elements of the first differential, two motion transmitter connections, a first connection for transmitting motion from the second element of the first differential to the second element of the second differential, and a second connection for transmitting motion from the third element of the first differential to the third element of the second differential, the first and second connections being of differing ratios, and such as to impart drives each in one and the same direction only to the first element of the second differential:—for the purposes set forth.

4. Apparatus comprising a transmitter device, a first mechanism and a second mechanism, the transmitter device having a transmitter element, and the second mechanism having a following element, the first mechanism being for producing with speed variation rotation in one and one direction only corresponding to a drive applied to be imparted to the following element, and the second mechanism being for determining direction of rotation of the following element, the apparatus having means for controlling the actions of the first and second mechanisms in accordance with movements of the transmitter element, the first and second mechanisms comprising:—a first shaft, a power drive applied to the first shaft to rotate it in one and one direction only, a second shaft, a first and a second differential. one element, a first element, of the first differential connected to rotate with the first shaft, and one element, a first element, of the second differtial connected to rotate with the second shaft, means for restraining or preventing rotation of the second and the third elements of the first differential, two motion transmitter connections, a first connection for transmitting motion from the second element of the first differential to the second element of the second differential, and a second connection for transmitting motion from the third element of the first differential to the third element of the second differential, the first and second connections being of differing ratios, and such as to impart drives each in one and the same direction only to the second shaft, a third shaft, a third and a fourth differential, one element, a first element of the third differential connected to rotate with the second shaft, one element, a first element of the fourth differential connected to rotate with the third shaft, means for restraining or preventing rotation of the second and third elements of the fourth differential, two motion transmitter connections, a third connection for transmitting motion from the second element of the third differential to the second element of the fourth differential, a fourth connection for transmitting motion from the third element of the third differential to the third element of the fourth differential, the third and fourth connections being such as to impart drives each in one but reverse directions to the third shaft:—for the purposes set forth.

WILLIAM STROUD.
JAMES WEIR FRENCH.